(12) United States Patent
Hao et al.

(10) Patent No.: US 12,018,930 B2
(45) Date of Patent: Jun. 25, 2024

(54) TRANSIENT DIGITAL MOIRE PHASE-SHIFTING INTERFEROMETRIC MEASURING DEVICE AND METHOD FOR THE SURFACE SHAPE OF AN OPTICAL ELEMENT

(71) Applicant: Beijing Institute of Technology, Beijing (CN)

(72) Inventors: Qun Hao, Beijing (CN); Yao Hu, Beijing (CN); Zhen Wang, Beijing (CN); Shaopu Wang, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 323 days.

(21) Appl. No.: 17/617,315

(22) PCT Filed: Feb. 8, 2021

(86) PCT No.: PCT/CN2021/075983
§ 371 (c)(1),
(2) Date: Dec. 8, 2021

(87) PCT Pub. No.: WO2021/160082
PCT Pub. Date: Aug. 19, 2021

(65) Prior Publication Data
US 2022/0252391 A1   Aug. 11, 2022

(30) Foreign Application Priority Data
Feb. 10, 2020   (CN) .......................... 202010091711.X

(51) Int. Cl.
*G01B 11/24* (2006.01)
*G02B 5/30* (2006.01)
*G02B 27/28* (2006.01)

(52) U.S. Cl.
CPC ........ *G01B 11/2441* (2013.01); *G02B 5/3025* (2013.01); *G02B 27/283* (2013.01)

(58) Field of Classification Search
CPC ............ G01B 11/2441; G01B 9/02041; G01B 9/02039; G01B 2290/70; G02B 5/3025; G02B 27/283; G01M 11/0271
See application file for complete search history.

(56) References Cited

FOREIGN PATENT DOCUMENTS

| CN | 104165582 A | 11/2014 |
|---|---|---|
| CN | 105865339 A | 8/2016 |

(Continued)

*Primary Examiner* — Tarifur R Chowdhury
*Assistant Examiner* — Roberto Fabian, Jr.
(74) *Attorney, Agent, or Firm* — Bayramoglu Law Offices LLC

(57) ABSTRACT

A transient digital moire phase-shifting interferometric measuring device and method for a surface shape of an optical element solves a defect that an instantaneous vibration resistance needs to be sacrificed for a measurement range when using a two-step carrier splicing method, and expands the measurement range of a digital moire phase-shifting method while retaining instantaneous anti vibration characteristics of the digital moire phase-shifting method. The transient digital moire phase-shifting interferometric measuring device includes a light source, a beam splitter, a reference lens, a first polarization grating, a measured lens, a second polarization grating, a first imaging objective lens, a first camera, a second imaging objective lens and a second camera. Different carriers are loaded through a spectral performance of a polarization grating, and the polarization grating is used to separate two beams of an interference light, and two actual interference patterns are obtained at a same time.

1 Claim, 1 Drawing Sheet

(56) References Cited

FOREIGN PATENT DOCUMENTS

| | | | | | |
|---|---|---|---|---|---|
| CN | 108562240 | A | * | 9/2018 | ......... G01B 11/2441 |
| CN | 108562240 | A | | 9/2018 | |
| CN | 111238397 | A | | 6/2020 | |
| JP | H1089929 | A | * | 4/1998 | |
| KR | 100906508 | B1 | * | 7/2009 | |
| KR | 100906508 | B1 | | 7/2009 | |

* cited by examiner

TRANSIENT DIGITAL MOIRE PHASE-SHIFTING INTERFEROMETRIC MEASURING DEVICE AND METHOD FOR THE SURFACE SHAPE OF AN OPTICAL ELEMENT

CROSS REFERENCE TO THE RELATED APPLICATIONS

This application is the national stage entry of International Application No. PCT/CN2021/075983, filed on Feb. 8, 2021, which is based upon and claims priority to Chinese Patent Application No. 202010091711.X, filed on Feb. 10, 2020, the entire contents of which are incorporated herein by reference.

TECHNICAL FIELD

The invention relates to the technical field of photoelectric detection, in particular to a transient digital moire phase-shifting interferometric measuring device for the surface shape of an optical element, and a method adopted by the transient digital moire phase-shifting interferometric measuring device for the surface shape of the optical element.

BACKGROUND

Digital moire phase-shifting interferometry is an aspheric surface detection method, which belongs to partial compensation interferometry. It is an instantaneous anti vibration interferometry method. It can realize high-precision measurement without moving camera structure.

Because digital moire phase-shifting interferometry needs low-pass filtering, spectrum aliasing will appear when the residual wavefront is large or the carrier is large, resulting in the phenomenon of solving the error area in digital moire phase-shifting interferometry, and the position of the error area is related to the size of the loaded spatial carrier. This leads to the limitation of residual wavefront bandwidth when using digital moire phase-shifting interferometry. The residual wavefront bandwidth of digital moire phase-shifting interferometry is only 0.707 of that of traditional multi-step phase-shifting interferometry.

In the case of spectrum aliasing, the position of the error area solved by the digital moire phase-shifting interferometry method is related to the size of the loaded spatial carrier. In order to solve the problem of limited residual wavefront bandwidth of the digital moire phase-shifting interferometry method, in the applicant's patent (Patent No. 201810067710.4, Title: Digital Moire Phase-shifting Interferometry Method Based on Two-step Carrier Splicing Method), a two-step carrier stitching method based on digital moire phase-shifting interferometry is proposed. By collecting two interferograms with different carriers, two surface errors with different error areas are solved. Then extract the correct areas of two surface shape errors for splicing, and finally get the complete surface shape error.

The two-step carrier splicing method expands the measurement range of the traditional digital moire phase-shifting method, eliminates the limitation of the residual wavefront bandwidth of the traditional digital moire phase-shifting method, and makes the residual wavefront bandwidth of the digital moire phase-shifting interferometry method equivalent to the traditional phase-shifting interferometry method. However, the existing two-step carrier splicing method needs to load the spatial carrier in turn, collect the corresponding interferogram I, load the spatial carrier and collect the corresponding interferogram II, that is, the acquisition of two interferograms needs to be separated for a period of time, which means that the two-step carrier splicing method loses the instantaneous anti vibration characteristics of the digital moire phase-shifting method.

Polarization grating is a diffractive optical element which realizes selective light splitting based on the polarization state of incident light. The diffraction angle depends on the spatial period of the grating. When the incident light of the polarization grating is linearly polarized light, its outgoing light is +1st order diffracted light and −1st order diffracted light, in which +1st order diffracted light is left-handed circularly polarized light and −1st order is right-handed circularly polarized light; When the incident light of the polarization grating is right-handed circularly polarized light, the outgoing light is +1-order diffracted light, and the polarization state of the diffracted light is left-handed circularly polarized light; When the incident light of the polarization grating is left-handed circularly polarized light, the outgoing light is −1-order diffracted light, and the polarization state of the diffracted light is right-handed circularly polarized light.

SUMMARY

In order to overcome the defects of the prior art, the technical problem to be solved by the invention is to provide a transient digital moire phase-shifting interferometric measuring device for the surface shape of an optical element, which solves the defect that the instantaneous vibration resistance needs to be sacrificed for the measurement range when using the two-step carrier splicing method, and expands the measurement range of the traditional digital moire phase-shifting method. At the same time, the instantaneous anti vibration characteristics of digital moire phase-shifting method are retained.

The technical scheme of the invention is as follows: The transient digital moire phase-shifting interferometric measuring device for the surface shape of an optical element comprises a light source (1), a beam splitter (2), a reference lens (3), a first polarization grating (4), a measured lens (5), a second polarization grating (6), a first imaging objective lens (7), a first camera (8), a second imaging objective lens (9) and a second camera (10).

The light source emits monochromatic linearly polarized light. After splitting by the beam splitter, a part of it is reflected to the surface of the reference lens and the other part is transmitted to the first polarization grating. The monochromatic linearly polarized light incident on the surface of the reference lens is reflected by the reference lens and passes through the beam splitter. The monochromatic linearly polarized light incident on the first polarization grating is divided into +1-order left-handed circularly polarized diffracted light as the first beam and −1-order right-handed circularly polarized diffracted light as the second beam by the spectral performance of the first polarization grating. The two beams form two included angles with the incident light in the same size and opposite directions, and are incident on the surface of the tested mirror as different spatial carriers with the frequencies of $f_{R1}$ and $f_{R2}$ respectively, and reflected back to the first polarization grating. After passing through the first polarization grating, the first beam becomes right-handed circularly polarized light, and the second beam becomes left-handed circularly polarized light. Both of them return to the beam splitter. After being reflected by the beam splitter, they interfere with the monochromatic linearly polarized light reflected by the reference lens, wherein, the first beam and the right-handed circular polarization component in the linearly polarized light generate the first interference light, the second beam and the left-handed circular polarization component in the linearly polarized light generate the second interference light, the first interference light is emitted to the first imaging objective lens after passing through the second polarization grating, and enters the first camera after converging through the first imaging objective lens to obtain the first interference pattern. The second interference light is emitted to the second imaging objective lens after passing through the second polarization grating, converges through the second imaging objective lens and enters the second camera to obtain the second interference pattern.

In the present invention, the monochromatic linearly polarized light incident on the first polarization grating is divided into +1-order left-handed circularly polarized diffracted light as the first beam and −1-order right-handed circularly polarized diffracted light as the second beam by the spectral performance of the first polarization grating. The two beams form two included angles with the incident light in the same size and opposite directions, and are incident on the surface of the tested mirror as different spatial carriers with the frequencies of $f_{R1}$ and $f_{R2}$ respectively, and reflected back to the first polarization grating. After passing through the first polarization grating, the first beam becomes right-handed circularly polarized light, and the second beam becomes left-handed circularly polarized light. Both of them return to the beam splitter. After being reflected by the beam splitter, they interfere with the monochromatic linearly polarized light reflected by the reference lens, wherein, the first beam and the right-handed circular polarization component in the linearly polarized light generate the first interference light, the second beam and the left-handed circular polarization component in the linearly polarized light generate the second interference light, the first interference light is emitted to the first imaging objective lens after passing through the second polarization grating, and enters the first camera after converging through the first imaging objective lens to obtain the first interference pattern. The second interference light is emitted to the second imaging objective lens after passing through the second polarization grating, converges through the second imaging objective lens and enters the second camera to obtain the second interference pattern. Therefore, two different carriers can be loaded to the measured surface at the same time, so as to shorten the measurement process, save the measurement time, and make the measurement have instantaneous anti vibration characteristics. When loading waves to the measured surface, there is no need to move any element in the measurement device, just adjust to the position when constructing the measurement device, so as to avoid the adjustment error caused by the moving element when loading the wave in the existing two-step carrier splicing method, reduce the error source and improve the measurement accuracy. Thus it can solve the defect that the instantaneous vibration resistance needs to be sacrificed for the measurement range when using the two-step carrier splicing method, expand the measurement range of the traditional digital moire phase-shifting method, and retain the instantaneous vibration resistance characteristics of the digital moire phase-shifting method.

A transient digital moire phase-shifting interferometric measuring method for the surface shape of an optical element is also provided, which comprises the following steps:

(1) A virtual interferometric measuring device is constructed to obtain the residual wavefront $\varphi_{RW}$ of the ideal system on the image plane;

(2) The actual interferometric measuring device is constructed according to the virtual interferometric measuring device;

(3) Through the light splitting performance of polarization grating, the polarization grating with large spatial period is used for light splitting. The +1-order diffracted light is used as the first beam and the −1-order diffracted light is used as the second beam, which are used as different spatial carriers with the frequencies of $f_{R1}$ and $f_{R2}$ respectively. Then another polarization grating with small spatial period is used to separate the two overlapping interference lights, and two interference patterns are obtained at one time. The interference pattern obtained by loading the spatial carrier $f_{R1}$ is defined as the first interference pattern, and the interference pattern obtained by loading the spatial carrier $f_{R2}$ is defined as the second interference pattern.

(4) The digital moire phase-shifting interferometric measuring method based on two-step carrier splicing method is used to solve the complete no error measured surface shape and realize the measurement of the measured surface shape.

Figure 1:
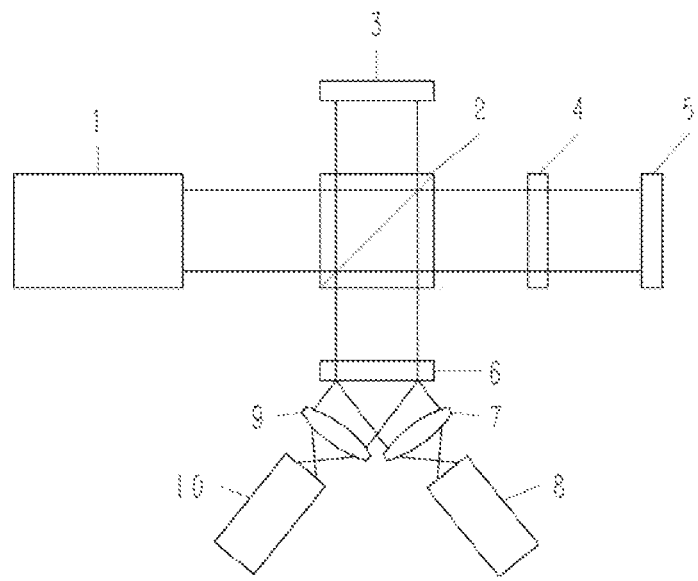
FIG. 1 shows the structural schematic diagram of the transient digital moire phase-shifting interferometric measuring device for the surface shape of an optical element.

Wherein, a light source 1, a beam splitter 2, a reference lens 3, a first polarization grating 4, a measured lens 5, a second polarization grating 6, a first imaging objective lens 7, a first camera 8, a second imaging objective lens 9 and a second camera 10.

DETAILED DESCRIPTION OF THE EMBODIMENTS

In order to enable those in the technical field to better understand the scheme of the invention, the technical scheme in the embodiment of the invention will be clearly and completely described below in combination with the accompanying drawings in the embodiment of the invention. Obviously, the described embodiments are only part of the embodiments of the invention, not all of the embodiments. Based on the embodiments of the invention, all other embodiments obtained by those skilled in the art without creative work should belong to the protection scope of the invention.

It should be noted that the term "including" and any deformation in the description and claims of the invention and the above drawings are intended to cover non exclusive inclusion, for example, the process, method, device, product or equipment including a series of steps or units need not be limited to those steps or units clearly listed, instead, it may include other steps or units that are not clearly listed or inherent to these processes, methods, products or equipment.

As shown in FIG. 1, the transient digital moire phase-shifting interferometric measuring device for the surface shape of an optical element, comprises a light source 1, a beam splitter 2, a reference lens 3, a first polarization grating 4, a measured lens 5, a second polarization grating 6, a first imaging objective lens 7, a first camera 8, a second imaging objective lens 9 and a second camera 10.

The light source emits monochromatic linearly polarized light. After splitting by the beam splitter, a part of it is reflected to the surface of the reference lens and the other part is transmitted to the first polarization grating. The monochromatic linearly polarized light incident on the surface of the reference lens is reflected by the reference lens and passes through the beam splitter. The monochromatic linearly polarized light incident on the first polarization grating is divided into +1-order left-handed circularly polarized diffracted light as the first beam and −1-order right-handed circularly polarized diffracted light as the second beam by the spectral performance of the first polarization grating. The two beams form two included angles with the incident light in the same size and opposite directions, and are incident on the surface of the tested mirror as different spatial carriers with the frequencies of $f_{R1}$ and $f_{R2}$ respectively, and reflected back to the first polarization grating. After passing through the first polarization grating, the first beam becomes right-handed circularly polarized light, and the second beam becomes left-handed circularly polarized light. Both of them return to the beam splitter. After being reflected by the beam splitter, they interfere with the monochromatic linearly polarized light reflected by the reference lens, wherein, the first beam and the right-handed circular polarization component in the linearly polarized light generate the first interference light, the second beam and the left-handed circular polarization component in the linearly polarized light generate the second interference light, the first interference light is emitted to the first imaging objective lens after passing through the second polarization grating, and enters the first camera after converging through the first imaging objective lens to obtain the first interference pattern. The second interference light is emitted to the second imaging objective lens after passing through the second polarization grating, converges through the second imaging objective lens and enters the second camera to obtain the second interference pattern.

In the present invention, the monochromatic linearly polarized light incident on the first polarization grating is divided into +1-order left-handed circularly polarized diffracted light as the first beam and −1-order right-handed circularly polarized diffracted light as the second beam by the spectral performance of the first polarization grating. The two beams form two included angles with the incident light in the same size and opposite directions, and are incident on the surface of the tested mirror as different spatial carriers with the frequencies of $f_{R1}$ and $f_{R2}$ respectively, and reflected back to the first polarization grating. After passing through the first polarization grating, the first beam becomes right-handed circularly polarized light, and the second beam becomes left-handed circularly polarized light. Both of them return to the beam splitter. After being reflected by the beam splitter, they interfere with the monochromatic linearly polarized light reflected by the reference lens, wherein, the first beam and the right-handed circular polarization component in the linearly polarized light generate the first interference light, the second beam and the left-handed circular polarization component in the linearly polarized light generate the second interference light, the first interference light is emitted to the first imaging objective lens after passing through the second polarization grating, and enters the first camera after converging through the first imaging objective lens to obtain the first interference pattern. The second interference light is emitted to the second imaging objective lens after passing through the second polarization grating, converges through the second imaging objective lens and enters the second camera to obtain the second interference pattern. Therefore, two different carriers can be loaded to the measured surface at the same time, so as to shorten the measurement process, save the measurement time, and make the measurement have instantaneous anti vibration characteristics. When loading waves to the measured surface, there is no need to move any element in the measurement device, just adjust to the position when constructing the measurement device, so as to avoid the adjustment error caused by the moving element when loading the wave in the existing two-step carrier splicing method, reduce the error source and improve the measurement accuracy. Thus it can solve the defect that the instantaneous vibration resistance needs to be sacrificed for the measurement range when using the two-step carrier splicing method, expand the measurement range of the traditional digital moire phase-shifting method, and retain the instantaneous vibration resistance characteristics of the digital moire phase-shifting method.

Preferably, the light source emits monochromatic linearly polarized light, and the specific polarization direction and wavelength are determined according to the actual measurement situation. And the beam aperture is not less than the aperture of the measured range on the measured surface.

Preferably, the beam splitter is a non polarizing beam splitter, its working wavelength range is selected according to the light source, and its luminous aperture is not less than the aperture of the measured range on the measured surface.

Preferably, the specific surface shape and surface flatness of the reference lens are determined according to the actual measurement, and its aperture is not less than the aperture of the measured range on the measured surface.

Preferably, the spatial period of the first polarization grating is large, and the included angle between the two diffracted beams obtained by splitting the incident linearly polarized light is small, so that the carrier size can ensure that the residual wavefront bandwidth is within the limited range; the working wavelength shall be selected according to the light source, and its aperture shall not be less than the aperture of the measured range on the measured surface.

Preferably, the measured lens can be a plane, a spherical surface or an aspherical surface.

Preferably, the spatial period of the second polarization grating is small, so that the two interference lights can be completely separated within the allowable distance range. Its working wavelength is selected according to the light source, and its aperture is not less than the aperture of the measured range on the measured surface.

Preferably, the first imaging objective lens and the second imaging objective lens have the same parameters and indicators, the focal length is selected according to the allowable distance range, the imaging quality is selected according to the comprehensive measurement accuracy requirements and camera parameters, the working wavelength is selected according to the light source, and the aperture is selected according to the outgoing light aperture of the second deflection grating.

Preferably, the first camera and the second camera have the same parameters and indicators, their performance is selected according to the requirements of measurement accuracy, their working wavelength range is selected according to the light source, and their image plane size is selected based on the output light aperture of the second polarization grating and the parameters of the imaging objective lens.

Figure 2:
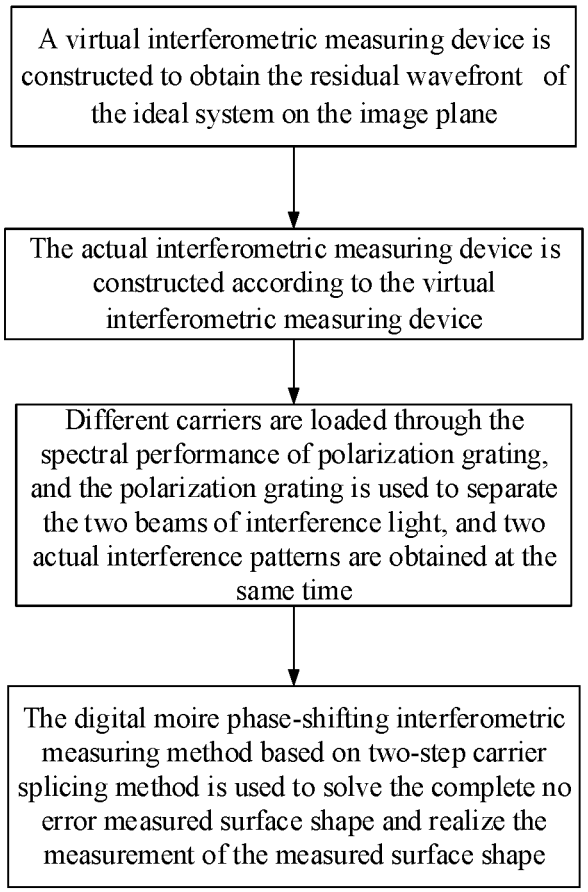
FIG. 2 shows the flow chart of the transient digital moire phase-shifting interferometric measuring method for the surface shape of an optical element.

As shown in FIG. 2, a transient digital moire phase-shifting interferometric measuring method for the surface shape of an optical element is also provided, which comprises the following steps:
(1) A virtual interferometric measuring device is constructed to obtain the residual wavefront (kw of the ideal system on the image plane;
(2) The actual interferometric measuring device is constructed according to the virtual interferometric measuring device;
(3) Through the light splitting performance of polarization grating, the polarization grating with large spatial period is used for light splitting. The +1-order diffracted light is used as the first beam and the −1-order diffracted light is used as the second beam, which are used as different spatial carriers with the frequencies of $f_{R1}$ and $f_{R2}$ respectively. Then another polarization grating with small spatial period is used to separate the two overlapping interference lights, and two interference patterns are obtained at one time. The interference pattern obtained by loading the spatial carrier $f_{R1}$ is defined as the first interference pattern, and the interference pattern obtained by loading the spatial carrier $f_{R2}$ is defined as the second interference pattern.
(4) The digital moire phase-shifting interferometric measuring method based on two-step carrier splicing method is used to solve the complete no error measured surface shape and realize the measurement of the measured surface shape.

Specific embodiments of the present invention are described in detail below.

The transient digital moire phase-shifting interferometric measuring method based on two-step carrier splicing method is used to measure the surface error of plane mirror. The measuring device is a transient digital moire phase-shifting interferometric measuring device based on two-step carrier splicing method, as shown in FIG. 1, including 1—light source, 2—beam splitter, 3—reference lens, 4—first polarization grating, 5—measured lens, 6—second polarization grating and 7—first imaging objective lens, 8—first camera, 9—second imaging objective, 10—second camera. The polarization grating is a diffractive optical element which realizes selective light splitting based on the polarization state of incident light, and the diffraction angle depends on the number of grating lines. By controlling the polarization state of the incident light, the polarization grating can regulate the energy distribution between +1-order and −1-order. Compared with the traditional grating, polarization grating has ultra-high diffraction efficiency. It can be used in a variety of applications such as spectral correlation, beam selection and wavelength selection. It can also be used to realize non mechanical large angle beam deflection. Compared with the traditional mechanical deflection device, the required space is small, and the added system weight can be ignored. Applications of polarization gratings include augmented reality (AR) systems (such as AR head mounted devices), beam deflection in telecommunications equipment and optical system. Some mainstream manufacturers offer standard polarization gratings with cycle of 5 μm, working wavelengths of 520 nm, 650 nm, 780 nm, 850 nm and 940 nm. In addition to standard polarization gratings, some manufacturers also provide a variety of customization services, including customization of special size, design wavelength, grating period, diffraction angle and other indicators.

The plane mirror of the tested lens described in this embodiment has a measured range of a circular region with a diameter of 23 mm. During the measurement, the light source emits monochromatic linearly polarized light with a central wavelength of 632.8 nm, and the beam aperture is 30 mm. The luminous aperture of the beam splitter is 25.4 mm. The reference lens is a standard plane mirror with a surface flatness of /10 and an aperture of 25.4 mm. The spatial period of the first polarization grating is 363 μm. The working wavelength is 633 nm, 1-order diffraction angle is about 0.10, and the aperture is 25.4 mm. The spatial period of the second polarization grating is 5 sm. The working wavelength is 633 nm and the aperture is 25.4 mm. The two interference beams can be completely separated after about 10 cm. The focal length of the first imaging objective and the second imaging objective is 50 mm, the working wavelength is 350 nm-700 nm, and the aperture is 25 mm. The resolution of the first camera and the second camera is 1024-1024, pixel size is 5 μm.

The measurement steps are as follows.
(1) A virtual interferometric measuring device is constructed to obtain the residual wavefront $\varphi_{RW}$ of the ideal system on the image plane.
(2) The actual interferometric measuring device is constructed according to the virtual interferometric measuring device.
(3) Through the light splitting performance of polarization grating, the first polarization grating with spatial period of 363 μm is used for light splitting. The +1-order diffracted light is used as the first beam and the −1-order diffracted light is used as the second beam, which are used as different spatial carriers with the frequencies of $f_{R1}=70/1024\lambda$/pixel and $f_{R2}=-70/1024\lambda$/pixel respectively. Then another polarization grating with spatial period of 5 μm is used to separate the two overlapping interference lights, and two interference patterns are obtained at one time. The interference pattern obtained by loading the spatial carrier $f_{R1}$ is defined as interference pattern I, and the interference pattern obtained by loading the spatial carrier $f_{R2}$ is defined as interference pattern II.
(4) According to step 3 to step 7 of the method proposed in patent CN201810067710.4, two-step carrier splicing is adopted to solve the complete error free measured surface shape and realize the measurement of the measured surface shape.

Steps 3 to 7 of the method proposed in patent CN201810067710.4 are as follows.

Step 3: use the digital moire phase-shifting interferometric measuring method to solve the interference pattern I and interference pattern II respectively: use the digital moire phase-shifting interferometric measuring method to solve the measured surface shape SFE1 when loading the carrier $f_{R1}$; The digital moire phase-shifting interferometric measuring method is used to solve the measured surface SFE2 when the carrier $f_{R2}$ is loaded.

Step 4: pre mark the error areas and compare whether the error areas overlap.

Step 4.1: take the measured surface shape SFE1 solved in step 3 as the base, and use the spatial carrier $f_{R1}$ to pre mark the solution error area ω1 of the measured surface shape SFE 1, ω1∈SFE1.

Step 4.2: take the measured surface shape SFE 2 solved in step 3 as the base, and use the spatial carrier $f_{R2}$ to pre mark the solution error area ω2 of the measured surface shape SFE 2, ω2∈SFE 2.

Step 4.3: check whether the error area ω1 and error area ω2 is completely separated without overlapping. If there is overlapping area, it is necessary to change the carrier loaded in step 2.

Step 5: according to the solution error area ω1 of the measured surface shape SFE 1 solved in step 4.1, extract the error free area SFE2' of the calculated measured surface shape SFE 2 in ω1.

$$SFE'_2 = \begin{cases} SFE_2, & (x, y) \in \omega_1 \\ 0, & (x, y) \notin \omega_1 \end{cases} \quad (1)$$

Step 6: calculate and solve the splicing vector τ=[Δa,Δb,Δc]T according to the measured surface shape SFE 1 and SFE 2 solved in step 3.

$$\begin{bmatrix} \sum_{i=1}^{m} x_i^2 & \sum_{i=1}^{m} x_i y_i & \sum_{i=1}^{m} x_i \\ \sum_{i=1}^{m} x_i y_i & \sum_{i=1}^{m} y_i^2 & \sum_{i=1}^{m} y_i \\ \sum_{i=1}^{m} x_i & \sum_{i=1}^{m} y_i & m \end{bmatrix} g\tau = \begin{bmatrix} \sum_{i=1}^{m} x_i \Delta \varphi_i \\ \sum_{i=1}^{m} y_i \Delta \varphi_i \\ \sum_{i=1}^{m} \Delta \varphi_i \end{bmatrix}, (x, y) \notin \omega_i \mathbb{B}(x, y) \notin \omega_2 \quad (2)$$

$\Delta\varphi_i = (x_i, y_i) - \varphi(x_i, y_i)$, $1 \leq i \leq m$, $\varphi_1(x,y)$ is the phase of the measured surface shape SFE1 solved. $\varphi_2(x,y)$ is the phase of the measured surface shape SFE1 solved.

Step 7: use splicing vector T to adjust the relative position and inclination of the error free surface SFE2' solved in step 5. The solved error free region SFE2' is used to replace the solved error region ω in the measured surface SFE1 to obtain the final complete error free surface shape SFE, and define the phase of the solved error free surface shape SFE as $$\varphi(x, y) = \begin{cases} \varphi_1(x, y), & (x, y) \notin \omega_1 \\ \varphi_2(x, y) + [x, y, 1]g\tau, & (x, y) \in \omega_1 \end{cases}, \quad (3)$$

The final complete error free measured surface shape SFE is obtained, that is, the problem of solving the error when using the digital moire phase-shifting interference method in large residual wavefront is solved, so as to expand the measurement range of the traditional digital moire phase-shifting method and eliminate the residual wavefront bandwidth limitation of the traditional digital moire phase-shifting method. The residual wavefront bandwidth of digital moire phase-shifting interferometric measuring method is equivalent to that of traditional phase-shifting interferometric measuring method, that is, to realize the measurement of the measured surface shape.

The above contents are only the preferable embodiments of the present invention, and do not limit the present invention in any manner. Any improvements, amendments and alternative changes made to the above embodiments according to the technical spirit of the present invention shall fall within the claimed scope of the present invention.

What is claimed is:

1. A transient digital moire phase-shifting interferometric measuring method for a surface shape of an optical element, comprising the following steps:
   (1) constructing a virtual interferometric measuring device to obtain a residual wavefront $\varphi_{RW}$ of an ideal system on an image plane,
   (2) constructing an actual interferometric measuring device according to the virtual interferometric measuring device,
   (3) through a light splitting performance of polarization grating, using a first polarization grating with a large spatial period for a light splitting, using a +1-order diffracted light as a first beam and using a −1-order diffracted light as a second beam, wherein the first beam and the second beam are used as different spatial carriers with frequencies of $f_{R1}$ and $f_{R2}$ respectively, then using a second polarization grating with a small spatial period to separate two overlapping interference lights, and obtaining two interference patterns at one time, defining a first interference pattern obtained by loading a spatial carrier $f_{R1}$ as a first interference pattern, and defining a second interference pattern obtained by loading a spatial carrier $f_{R2}$ as a second interference pattern,
   (4) using a digital moire phase-shifting interferometric measuring method based on a two-step carrier splicing method to solve a complete no error measured surface shape and realizing measurement of a measured surface shape.

* * * * *